United States Patent
Gamble et al.

[11] Patent Number: 5,981,733
[45] Date of Patent: Nov. 9, 1999

[54] APPARATUS FOR THE CHEMICAL SYNTHESIS OF MOLECULAR ARRAYS

[75] Inventors: Ronald C. Gamble, Altadena; Thomas P. Theriault, Manhattan Beach; John D. Baldeschwieler, Pasadena, all of Calif.

[73] Assignee: Incyte Pharmaceuticals, Inc., Palo Alto, Calif.

[21] Appl. No.: 08/714,867

[22] Filed: Sep. 16, 1996

[51] Int. Cl.[6] .............................. B01J 19/00; C07H 21/00
[52] U.S. Cl. ...................... 536/25.3; 435/6; 435/91.1; 435/283.1; 435/285.1; 435/286.2; 435/286.4; 435/286.5; 435/287.2; 435/287.3; 422/129.131; 422/149.11; 422/111; 239/102.2
[58] Field of Search ........................ 435/6, 91.1, 283.1, 435/285.1, 286.2, 286.4, 286.5, 287.2, 287.3; 422/129.131, 149.11, 111; 139/102.2

[56] References Cited

U.S. PATENT DOCUMENTS 5,472,672 12/1995 Brennan .................................. 422/131
5,474,796 12/1995 Brennan .................................. 427/2.13
5,529,756 6/1996 Brennan .................................. 422/131

OTHER PUBLICATIONS

Blanchard et al., "High–density oligonucleotide arrays", *Biosensors & Bioelectronics*, 11: 687–690 (1996).

Primary Examiner—Kenneth R. Horlick
Assistant Examiner—Janell Taylor
Attorney, Agent, or Firm—Incyte Pharamaceuticals, Inc.

[57] ABSTRACT

An apparatus for the automated synthesis of molecular arrays. A jetting device is employed along with a reaction chamber to dispense reagents used in the synthesis onto the substrate. A positioning system moves the substrate from the jet to the reaction chamber. A controller controls the movement of the substrate and the application of the reagents so that the synthesis is carried out according to a predetermined procedure. The apparatus will synthesize nucleotides in an array of micron-size spots according to a pattern selected by the operator immediately prior to synthesis.

18 Claims, 12 Drawing Sheets

APPARATUS FOR THE CHEMICAL SYNTHESIS OF MOLECULAR ARRAYS

BACKGROUND

Chemical arrays find a variety of applications for the development of new physiologically active compounds, in diagnostics, as well as in other applications. The arrays provide a large number of different compounds in a relatively small space. For a proper array, each compound must have a uniquely defined area, which does not impinge on other areas and allows for detection of an event of interest. To provide arrays which can be used successfully, there are many constraints.

To produce arrays one must be able to reproducibly perform reactions at a particular site without affecting adjacent sites. The reaction should approximate stoichiometry in producing the desired product. Since many of the reactions are performed stepwise, any failure during the synthesis will result in the wrong product. One must be able to define the site at which the reaction occurs in a rapid and efficient manner. Each step in the process should provide for a reproducible result and not interfere with the next stage or the reaction at a different site.

Since the arrays should provide for a large number of different compounds, the process requires many steps. With oligonucleotides, each monomer addition involves a plurality of steps, so that the synthesis at each site will involve the number of steps for each addition multiplied by the number of monomers in the oligonucleotide. In order to be able to produce arrays of oligonucleotides efficiently, it is important to develop automated systems which provide for the accurate placement of reagents, efficient reaction, close packing of different compounds and the indexing of individual oligonucleotides with a particular site in the array. There is, therefore, a great interest in developing systems which will provide for rapid, accurate production of arrays of compounds, where the compounds are synthesized in situ, and the arrays have a high density and clear separation between sites. The apparatus must provide for assurance of the efficient synthesis and the ability to identify the product at a particular site.

In the past, preparation of these arrays was a slow, unreliable process. Moreover, where attempts have been made at automation, a lengthy, pre-synthesis preparation of masks was necessary, and undesirably large quantities of costly reagents were employed.

SUMMARY OF THE INVENTION

An apparatus is provided for the production of high density molecular arrays on a substrate in a reliable, automated manner. A reservoir system is provided for holding the reagents used in the synthesis process. At least one of these reagents is dispensed by a jetting system which localizes the synthesis on the substrate by providing a micro-sized spot of reagent. The remaining reagents are flowed over the surface of the substrate generally in a reaction chamber. A conduit system connects the reservoir system with the reaction chamber and the jetting system. The substrate itself is held in a substrate holder and positioned by a positioning system which orients the substrate and the jetting system so that the reagents applied by the jetting system can be applied at specific locations on the substrate. The positioning system either moves the jetting system or the substrate to index the two in relation to the synthesis site on the substrate. The positioning system also moves some combination of the substrate, the reaction chamber, and the jetting system to bring the substrate either into an operable relationship with the reaction chamber or with the jetting system. Finally, a master controller controls the sequencing and timing of each element of the invention according to directions supplied by the operator or another machine.

In addition to these basic elements, the invention may also comprise means for monitoring the jetting of the substrate, an enclosure to maintain a proper atmosphere surrounding the system, and means to maintain that atmosphere in the enclosure. The system may further comprise means for washing and drying the surface of the substrate at a wash station.

The invention may be used for synthesizing arrays using many methods, including the phosphoramidite method of synthesis for oligonucleotides.

In one embodiment of the invention, the jetting system dispenses a phosphoramidite reagent onto the substrate. In this embodiment, the controller system directs the phosphoramidite from the reservoir in the reservoir system to the jetting system. In this way, the localization of the reactions is controlled by the jetting of the phosphoramidite reagents onto specific locations on the substrate. When the jetting system is used for jetting phosphoramidite in this manner, the jet is maintained in an anhydrous environment.

In another embodiment of the invention, the reagent which is jetted is the de-protect reagent. In this embodiment, the controller system directs the deprotect from the reservoir in the reservoir system, to the jetting system. In this embodiment, the localization of the synthesis is ensured by jetting the deprotect reagent at specific locations. Therefore, only at a specific site, or sites, is the terminal phosphate from the previous step of synthesis de-tritylated and therefore ready for further reactions.

Other embodiments of the invention may comprise multiple jetting devices in the jetting system or a system for recycling spent reagents.

The utility of this device is its ability to accomplish the task of producing high density molecular arrays in a reliable, automated manner. The subject instrument allows for high density arrays where the composition of the synthesized polymer at each site is defined by the user prior to synthesis. No lengthy preparation of masks must precede the array synthesis. A further advantage of this device is its sparing use of reagents and the ability to synthesize minute quantities of oligonucleotide that may be removed from the substrate surface at the end of synthesis.

BRIEF DESCRIPTION OF THE DRAWINGS

These and other features, aspects, and advantages of the present invention will become better understood with regard to the following description, appended claims, and accompanying drawings where:

DESCRIPTION OF THE SPECIFIC EMBODIMENTS

Figure 1:
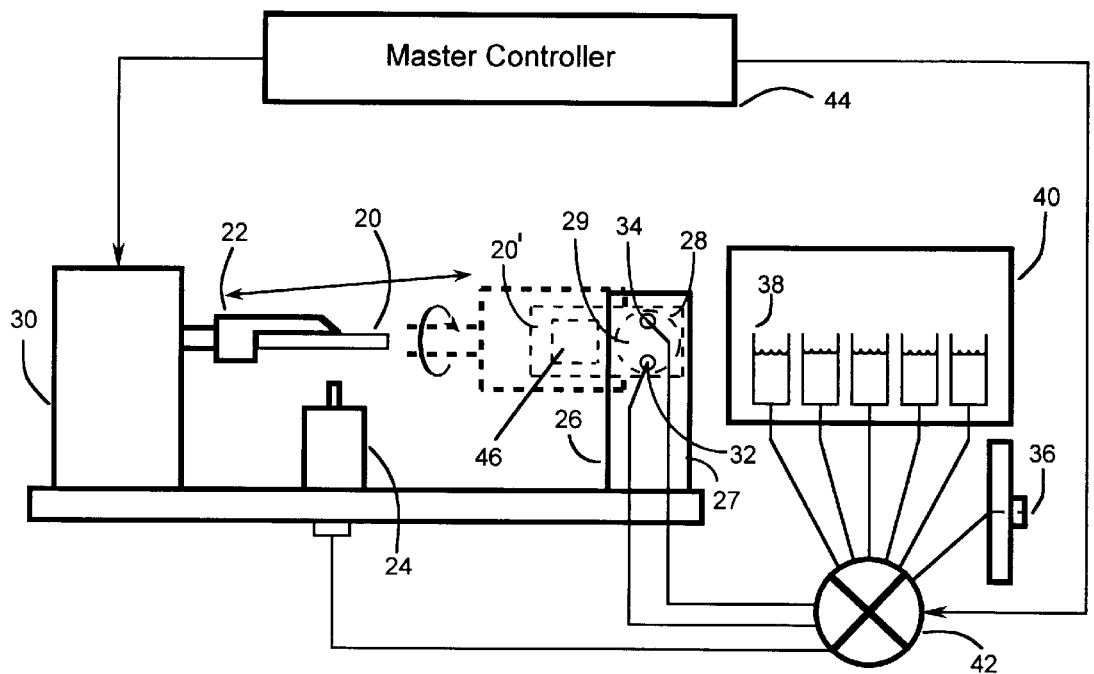
FIG. 1 is a block diagram of an embodiment of the invention.

The subject invention comprises a system for producing high density molecular arrays on a substrate in a reliable, automated manner. FIG. 1 is a block diagram showing the elements of the invention and their general structural relationship according to one version of the invention. As shown in FIG. 1, the substrate 20 is held by a substrate holder 22. This holder may be customized to hold a particular substrate or it may be generic, able to hold substrates of many sizes. The substrate has at least one active surface on which the molecular array is synthesized.

The molecular array is synthesized by sequentially reacting reagents with the compounds on the active surface of the substrate. Thus, systems are provided for dispensing the reagents onto the substrate. These systems include a jetting system 24 and a reaction chamber 26. The jetting system is used for dispensing micro-sized spots of reagent in particular locations, while the reaction chamber allows reagents to be dispensed in a general, non-localized manner.

The reaction chamber 26 provides an environment, normally sealed, in which reagents can flow over and immerse the substrate 20'. In this specific embodiment, the reaction chamber is sealed by an O-ring 28 sandwiched between the substrate 20' and the reaction chamber mount 27. When the reaction chamber is sealed in this manner, a small cell 29 is formed in which the reagents may flow across the surface of the substrate 20'. If the reagents to be used in the reaction chamber 26 are phosphoramidite, the reaction chamber is able to be maintained anhydrous, that is, the environment is substantially free of water which would react with the reagent. This can be accomplished by never allowing water into the reaction chamber cell 29, or, if water is used as one of the reagents in the reaction chamber, by drying the reaction chamber cell 29 with dry gas after the water is used.

In order for the reagents to come into contact with the substrate, the substrate is operably positioned with either the jetting system or the reaction chamber. For this purpose a positioning system 30 is provided for moving the mobile elements of the invention in relation to another, usually fixed, element. Another purpose of the positioning system is to orient the substrate and the jetting system to each other such that the spots of reagent dispensed by the jetting system contact the substrate at a predetermined location. After each spot or pattern is dispensed, the positioning system is able to re-orient the jetting system and the substrate such that the next spot or pattern dispensed will be in a new location, In FIG. 1, the positioning system 30 is shown controlling the movement of the substrate holder 22 while the jetting system 24 and the reaction chamber 26 are held stationary. Alternatively, the substrate holder could remain stationary while the positioning system moves both the jetting system and the reaction chamber. Naturally, various combinations of these two alternatives may also be used according to the specific needs of the designer.

FIG. 1 shows a further characteristic of the positioning system 30 wherein the positioning system 30 is capable of rotating the substrate 20 about an axis. In the case of FIG. 1, the axis of rotation is the long axis of the substrate 20. Thus, in FIG. 1, the substrate 20 is shown positioned horizontally in an operable relationship with the jetting system 24 and alternatively the substrate 20' is shown positioned vertically in an operable relationship with the reaction chamber 26.

The rotational ability of the positioning system is beneficial because it is desirable to have the substrate 20' in a vertical position while it is operably positioned with the reaction chamber 26, although a vertical position is not essential and the substrate may be horizontal or any intermediate position. With the substrate 20' in a vertical position, the reagents in the reaction chamber 26 can be made to flow in through a bottom port 32 and out through a top port 34. This will ensure that the entire surface of the substrate 20' is evenly contacted by the reagent, because bubbles in the reagent stream can exit the reaction chamber cell 29 at the exit port 34 at the top of the reaction chamber cell 29.

The individual reagents may be introduced into the reaction chamber through a receptacle 36. This receptacle may be designed to interface with an external reagent source such as a oligonucleotide column synthesizer. Alternatively, the reagents may be stored in containers 38 held in a reservoir system 40 within the present invention. The reagents may include phosphoramidite, wash reagent, deprotect reagent, an activation reagent, an oxidation reagent or any other reagent necessary for the synthesis. Depending upon the product being synthesized, functional groups may be activated, such as carboxyl with carbodiimide, mercaptans with Ellman's reagent, etc.

During synthesis, the reagents are transported from the receptacle or the containers in the reservoir system to the reaction chamber or the jetting system by means of a conduit system 42. The conduit system also carries spent reagents away from the reaction chamber. The interconnection between the reaction chamber, jetting system and the reagent source is dynamic, such that the routing of reagents can be changed at each step of the synthesis according to the predetermined method chosen by the operator.

Usually, the conduit system will comprise a plurality of tubes or pipes, and an assortment of valves. The tubes or pipes will be connected to the various elements of the system, such as the containers in the reservoir system, the receptacle, the jetting system and the reaction chamber. The valves, which may either be solenoid valves or rotational valves, are connected between the tubes or pipes to turn on or off the reagent flow to any particular element, or occasionally to change the reagent which flows to a specific element. The conduit system is carefully designed to prevent any contamination by introducing different reagents through the same valve or tube. This is especially true of the phosphoramidite reagents, which must be kept separate from the deprotect and the wash reagents.

The conduit system may also comprise means for ensuring that the reagents reach the jetting system or the reaction chamber at the correct pressure. Furthermore, the conduit system connects, by means of valves and pipes or other standard means, the various sources of dry gas and vacuum which might be necessary to dry or clean the elements of the invention.

To ensure that the molecular array is synthesized properly, the positioning system and the conduit system are synchronized. This is carried out by a master controller 44 connected to the two systems. The controller's function is to follow a set of instructions from an operator or another machine, such as a computer. As instructed, the controller issues commands which direct the flow of the individual reagents through the conduit system to either the jetting system or the reaction chamber. The controller also issues commands to direct the positioning system to move the substrate between the jetting system and the reaction chamber, and to orient the substrate with the jetting system for applying the reagent in a predetermined specific location.

To control the invention, the controller translates the instructions into electrical signals for operating valves in the conduit system, and for controlling positioning motors or other actuators in the positioning system. Further, the controller may comprise memory and processing means for interpreting general instructions from the operator or another machine and translating these general instructions into a specific sequence of electrical signals which will interface with the conduit system and the positioning system to synthesize the array.

The synthesis of molecular arrays on the substrate using the invention described above and shown in FIG. 1 is as follows. First, the operator loads a substrate 20 into the substrate holder 22. The operator then connects an external reagent source to the receptacle 36 and/or fills the internal containers 38 with the appropriate reagents. Next, the operator loads a sequence of instructions representing the synthesis steps into the controller 44. Under the command of the controller 44, the positioning system 30 moves the substrate holder 22, and therefore the substrate 20, into operable relationship with either the reaction chamber 26 or the jetting system 24, depending upon the specific synthesis step.

If the synthesis step involves jetting, the positioning system 30 orients the substrate 20 such that the reagent is jetted to the desired position on the substrate. If more than one spot is to be dispensed, the positioning system re-orients the substrate after each spot. During the jetting, the conduit system 42 routes the appropriate reagent to the jetting system 24. In this way, an array of spots of reagent 46 are formed on the substrate 20 according to a pre-determined pattern.

During a reaction chamber step, the positioning system 30 rotates the substrate 20 and positions the rotated substrate 20' against the O-ring 28, thus sealing the reaction chamber 26. The conduit system 42 routes the appropriate reagents to the reaction chamber cell 29, which enter the chamber through the bottom port 32 and exit through the top port 34. In the reaction chamber cell 29, the reagents react with the array on the substrate 20'. If a phosphoramidite reagent is to be dispensed, the reaction chamber cell 29 is first dried by means of a dry compressed gas.

As the substrate 20 is cyclically moved between the jetting system 24 and the reaction chamber 26, the reagents can be applied in a sequential manner following the appropriate pattern for synthesis according to the chosen method.

Figure 2:
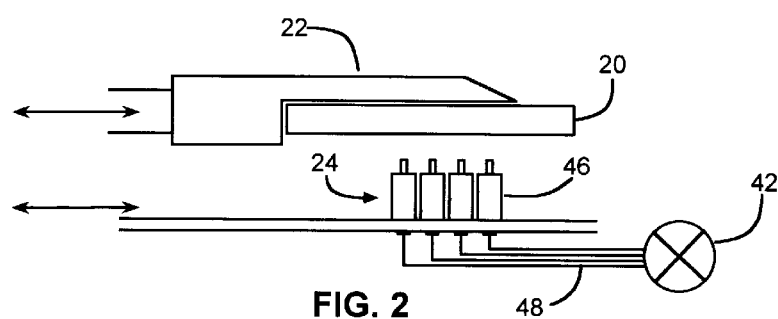
FIG. 2 is a detail of an embodiment of the invention showing multiple jets.

FIG. 2 shows an alternate arrangement of the jetting system 24 wherein the jetting system comprises multiple jetting devices 46, which could be either piezoelectric or a bubble jets. The use of multiple jetting devices increases the throughput of the invention by allowing the application of many spots of reagent simultaneously. As shown in FIG. 2, each jet has its own supply line 48 which is connected to the conduit system 42. In this way, the conduit system can direct a different reagent to each jet, or the same reagent to all of the jets according to the needs of the particular application. Furthermore, FIG. 2 shows all of the jets connected together in a pre-determined pattern. Alternatively, they could be individually positionable by separate actuators.

Figure 3:
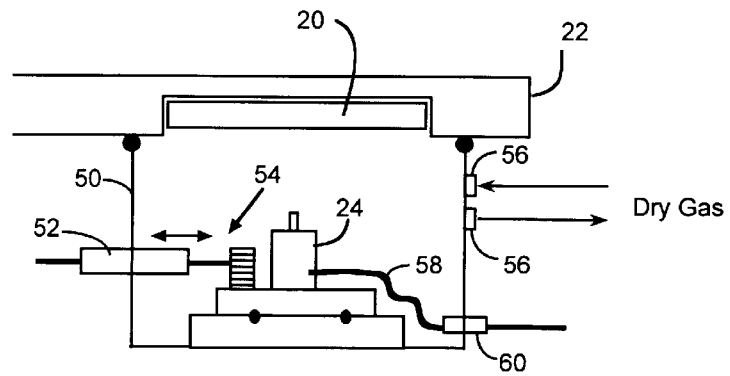
FIG. 3 is a detail of an embodiment of the invention showing the jetting system in a sealed enclosure for jetting phosphoramidite.

If the jetting system 24 is to dispense phosphoramidite reagent, then the jetting system is maintained in an anhydrous environment. This could be accomplished by enclosing the jetting system in a sealed enclosure as shown in FIG. 3. In this situation, the enclosure 50 is penetrated on the side by an actuator 52. The actuator is connected to the jetting system 24 such that the actuator can move the jetting system 24 relative to the substrate 20. This may be accomplished, for example, by a rack-and-pinion system 54 as shown in FIG. 3, or alternatively by any other conventional means. The enclosure is maintained anhydrous by a dry gas entering and exiting through two drying ports 56. The jetting reagents are supplied to the jetting system 24 through a tube 58 which enters the enclosure through a port 60.

Figure 4A:
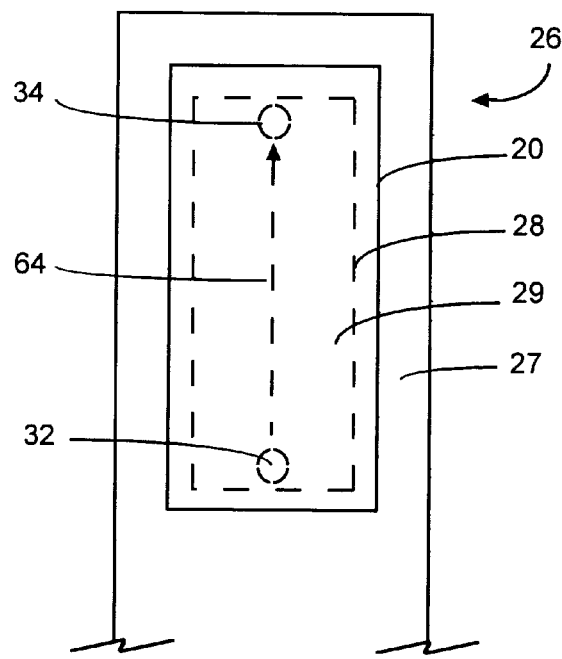
FIGS. 4A, 4B and 4C is a schematic representation of the design of the reaction chamber.
Figure 4B:
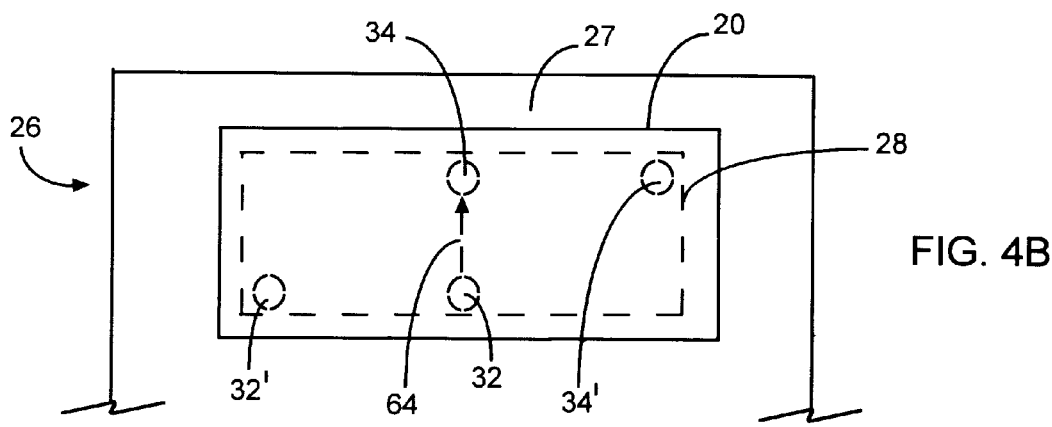
Figure 4C:
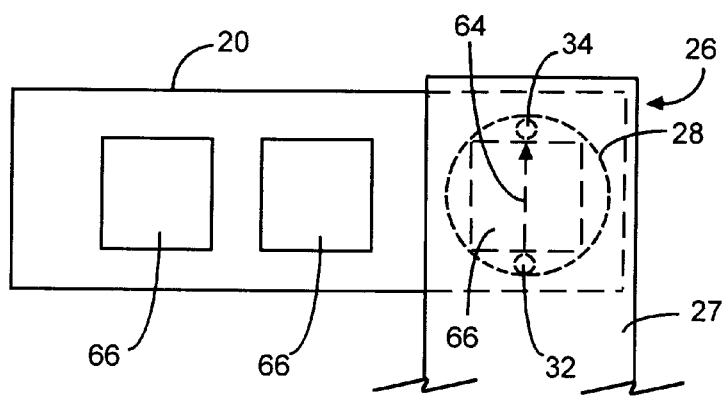

FIGS. 4a, 4b, and 4c will be used to describe the design of the reaction chamber 26. In FIGS. 4a, 4b, and 4c, the substrate 20 is pressed against a seal 28. This seal defines the perimeter of the reaction chamber cell 29 which is formed between the substrate 20 and the reaction chamber mount 27. Reagents enter the reaction chamber cell 29 through a bottom port 32 and exit through a top port 34.

The reaction chamber 26 is carefully designed in order to ensure that the entire surface of the substrate 20 is uniformly covered with regent. Where the substrate 20 has a long and a short dimension, it is preferable that the substrate 20 be rotated such that its long dimension is vertical, as shown in FIG. 4a. In this way, as reagents enter the reaction chamber cell 29 from the bottom port 32 and flow upwards, bubbles in the reagent stream are likely to exit through the top port 34. Furthermore, by holding the substrate 20 with its long dimension vertical, the maximum surface area of the substrate 20 is in the path 64 of the reagent stream between the two ports 32 and 34.

FIG. 4b shows the substrate 20 held with its short dimension vertical. In this position, the majority of the surface of the substrate 20 is not directly in the path 64 of the reagent stream between the entrance and exit ports of the reaction chamber 26. Thus, bubbles may be caught in the cell, the reagent may not fill the entire cell, and the reagent in the cell will not be circulated efficiently or uniformly across the entire surface of the substrate. These problems may be partially eliminated by placing the bottom port 32' in one corner of the cell, and the top port 34' in the opposite corner.

Sometimes, however, it is desirable to position the substrate such that its short dimension is vertical. This may be for ease of device construction, or space limitations. Where this is the case, the reaction chamber 26 may be designed to immerse only a small portion of the substrate 20 with reagent. This is shown in FIG. 4c. As shown, the surface of the substrate 20 covered by the reaction chamber cell 29, as defined by the seal 28, is at least as high in the vertical direction as it is wide in the horizontal direction. In FIG. 4c, the reaction chamber 26 comprises a circular seal 28, formed by an O-ring. By carefully designing the reaction chamber 26 in this fashion, the majority of the surface of the substrate 20 in the reaction chamber cell 29 is between the path 64 of the reagent stream from the bottom port 32 to the top port 34. Furthermore, the top port 34 is at the highest position in the reaction chamber cell 29, facilitating the removal of bubbles in the reagent stream.

In order to achieve the maximum utilization of the substrate 20 in this situation, a plurality of arrays of reagent 66 may be formed across the surface of the substrate. Each array may then be sealed with the reaction chamber 26 separately. This arrangement, as shown in FIG. 4c, is the arrangement which is utilized in FIGS. 1, and 8–14.

Figure 5:
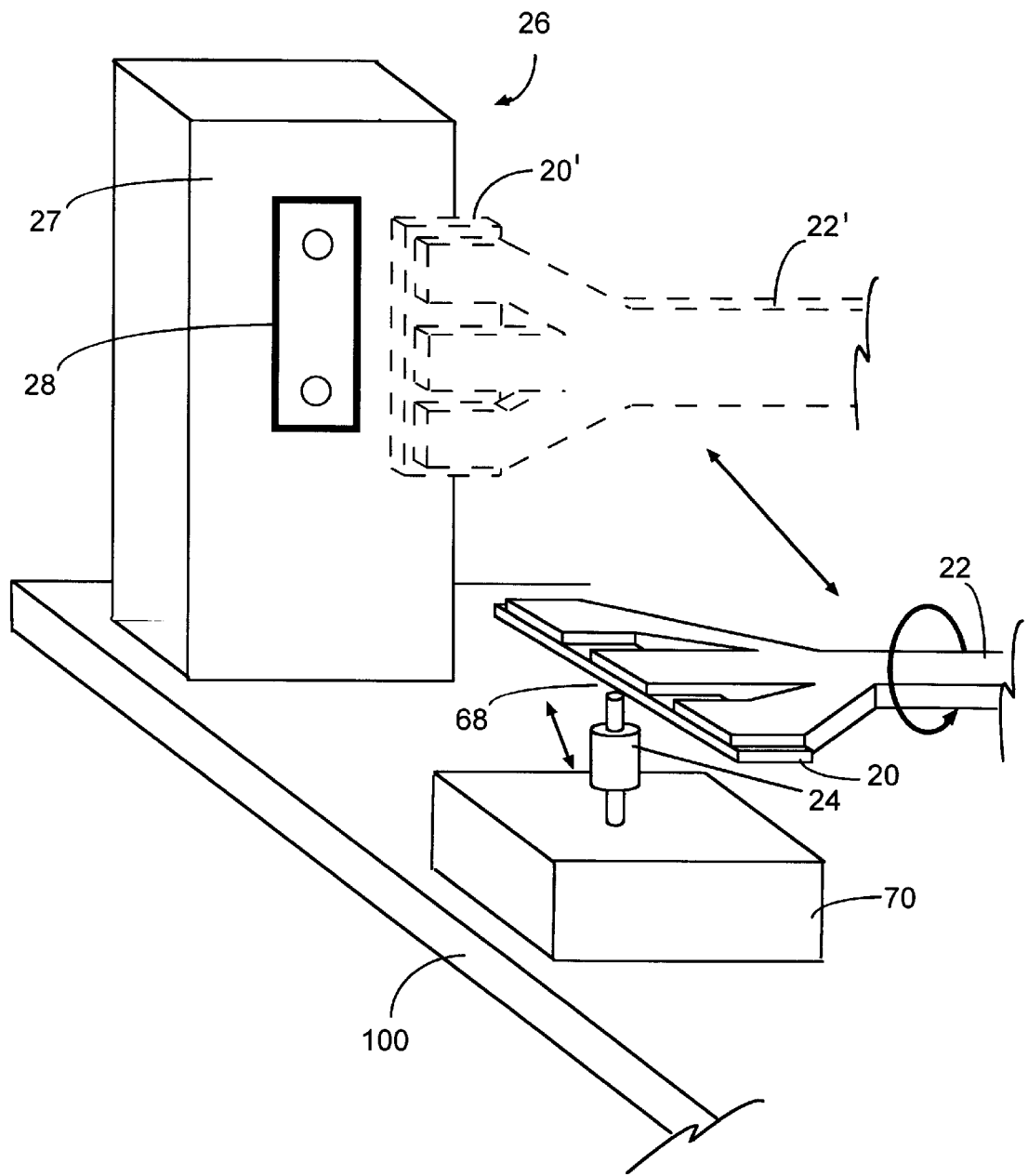
FIG. 5 is a perspective view of one embodiment of the substrate holder.
Figure 6:
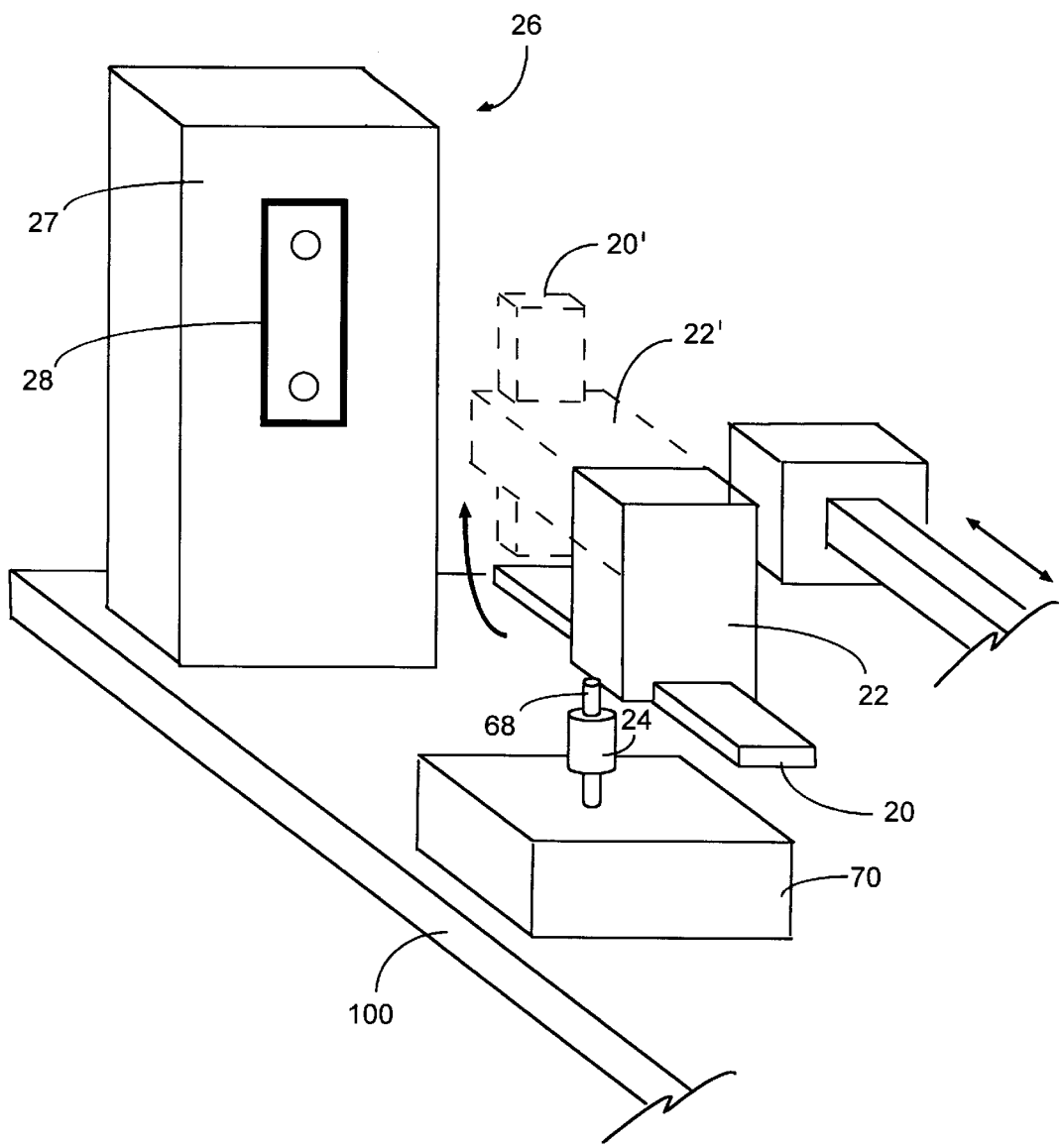
FIG. 6 is a perspective view of one embodiment of the substrate holder.

FIGS. 5–7 show alternative constructions of the positioning system 30 as it relates to the substrate holder 22 and the reaction chamber 26. These alternatives show various ways of achieving the "long-dimension vertical" position shown in FIG. 4a. They are presented by way of example and illustration, and are not meant to be exhaustive of the ways to achieve this orientation. The person skilled in the art will be able to substitute conventional alternative structures according to the specific needs of the system without leaving the spirit and scope of the present invention.

FIG. 5 shows the substrate 20 held in a substrate holder 22 with the long axis of the substrate 20 perpendicular to the rotational axis of the holder 22. In its horizontal position, the substrate 20 is very close to the jetting nozzle 68, and therefore the substrate 20 is moved away from the nozzle 68 before it is rotated into its vertical position. Alternatively, the jetting system 24 may be moved out of the way of the rotating substrate 20 by means of a vertical positioner 70. When the substrate 20 is rotated, the rotated substrate 20' is now in a vertical position where the long dimension of the substrate 20' is vertical. The rotated substrate 20' is then pressed against the reaction chamber seal 28, sandwiching the seal 28 against the reaction chamber mount 27, forming the desired relationship.

FIG. 6 shows the substrate 20 held in a rotatable substrate holder 22. In this embodiment, the substrate 20 is rotated about an axis parallel to the substrate's short dimension and through its center. Again, in this embodiment, the rotated substrate 20' is in a vertical position with its long dimension vertical. As in FIG. 5, either the jetting nozzle 68 or the substrate 20 is moved before the rotation takes place in order to prevent the substrate 20 from impacting the jetting nozzle 68.

Figure 7A:
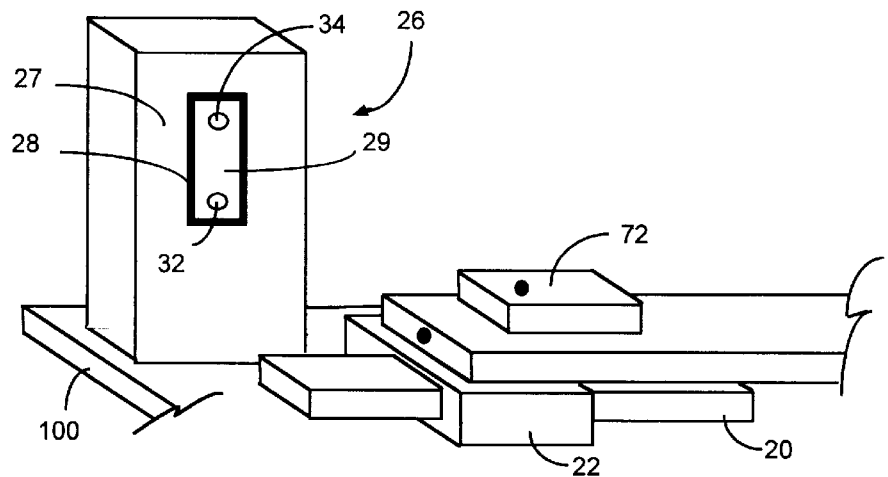
FIGS. 7A, 7B and 7C is a perspective view of one embodiment of the substrate holder, further showing a means for recycling spent phosphoramidite reagent.
Figure 7B:
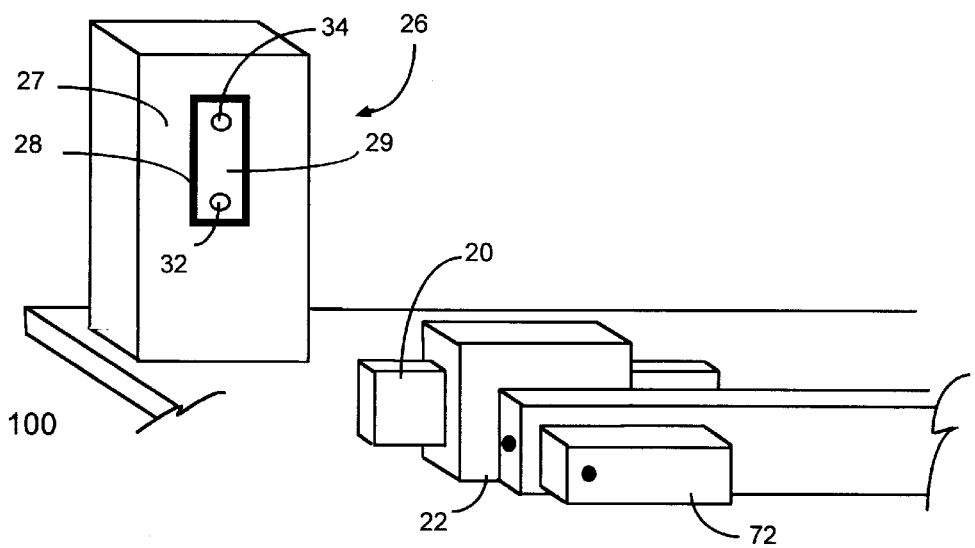
Figure 7C:
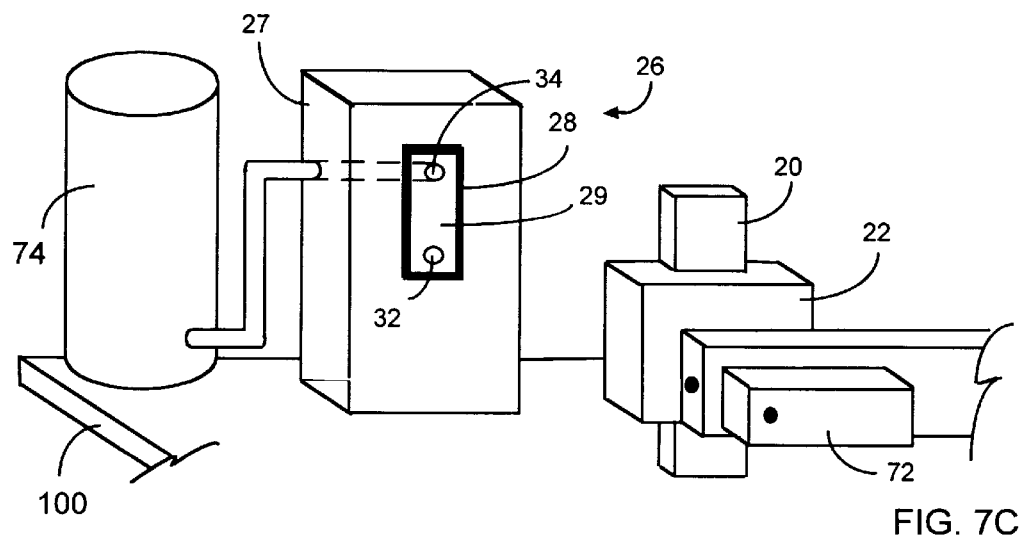

FIG. 7 shows yet another embodiment of a suitable substrate holder 22 for accomplishing the orientation of FIG. 4a. In FIG. 7, the substrate 20 is rotated about an axis normal to its active surface and through its center by an actuator 72. In addition, the substrate holder 22 is rotated about an axis perpendicular to the axis of rotation of the substrate 20. FIG. 7a shows the substrate 20 in a horizontal position, as the substrate would be during a jetting step. After jetting, the substrate holder 22 is rotated as shown in FIG. 7b. Then, the substrate 20 is rotated into a position with its long dimension vertical as shown in FIG. 7c. As in FIGS. 5 and 6, the jetting system is be moved out of the way before rotation to prevent the substrate 20 from impacting the jetting nozzle.

FIG. 7c further shows an alternative arrangement of the present invention wherein the spent phosphoramidite reagent from the reaction chamber is recycled. In this embodiment, the spent reagent is carried from the reaction chamber 26 after it has reacted with the substrate 20 to an ion exchange column 74. In the ion exchange column 74, amines, the waste product of the reaction in the reaction chamber, are taken out of the solution. Then, the reagent is replenished with new phosphoramidite and returned to its source via the conduit system.

This recycling process is carried out once or less frequently depending on the concentration of amine in the reacted solution. The amine concentration is dependent upon the total volume of reagent in the reaction chamber 26, the amount of reagent which has reacted with the substrate 20, and the number of times that the same reagent has been used for reactions. When the amine concentration is too high, as determined by monitoring the spent reagent coming from the reaction chamber 26, the reagent is recycled as described above and shown in FIG. 7.

Figure 8:
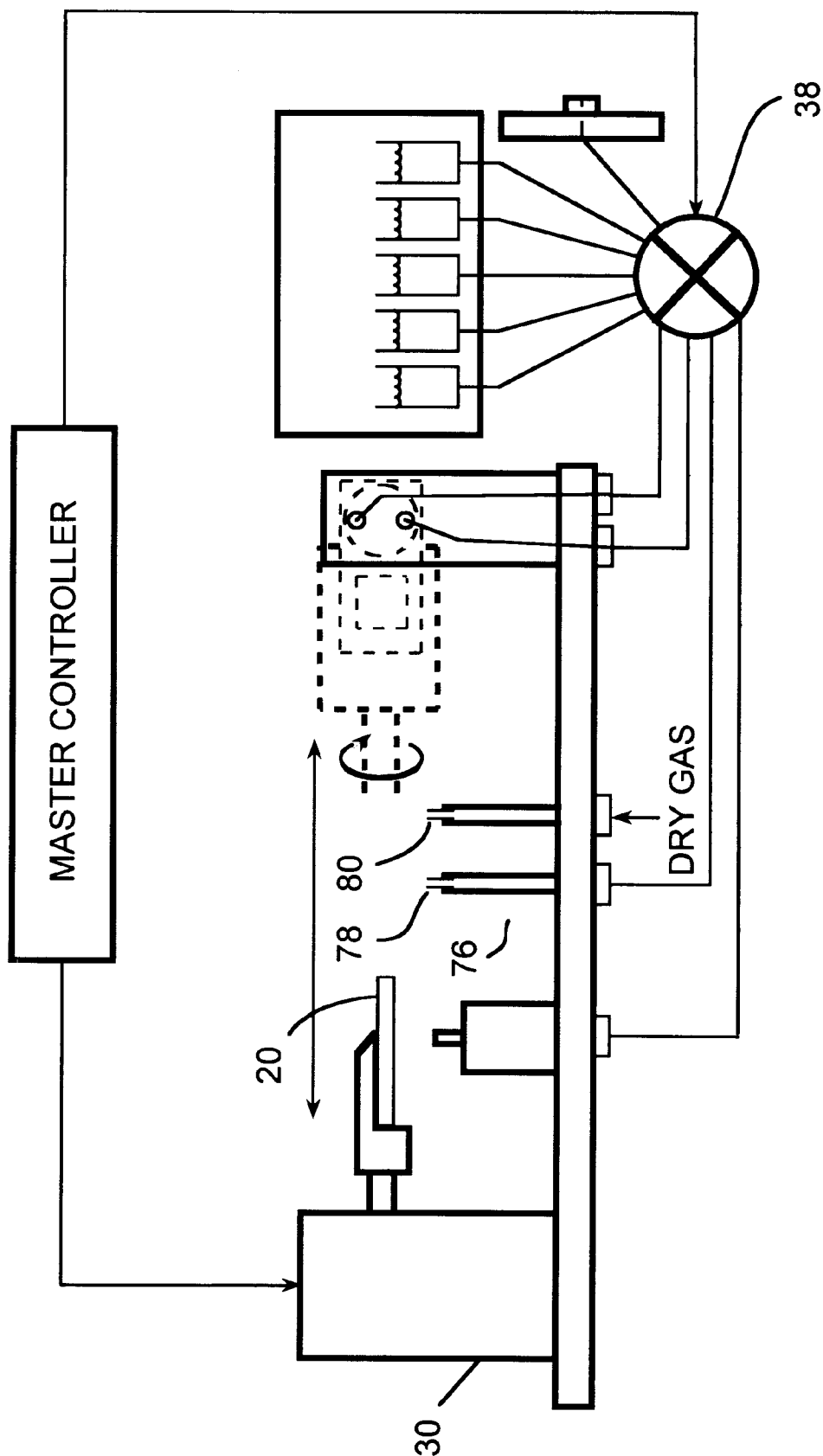
FIG. 8 is a block diagram of an embodiment of the invention utilizing a wash station.

FIG. 8 shows another embodiment of the current invention further comprising a wash station 76, connected to the conduit system 42 to receive the wash reagent. The wash reagent is sprayed onto the surface of the substrate 20 through a wash orifice 78. The wash station 76 also comprises means 80 for providing a stream of dry gas which may be blown over the substrate to dry it. Incorporating a separate wash station in the invention precludes the problems of maintaining an anhydrous reaction chamber because water-based reagents can be dispensed outside the reaction chamber, and the substrate can be dried before entering the reaction chamber.

When a separate wash station is utilized, the positioning system 30 is capable of moving the substrate 20 and the wash station 76 into operable relationship with each other. As in the previous examples, this is accomplished by holding one of either the wash station or the substrate holder stationary and moving the other.

FIGS. 9–14 show a specific detailed embodiment of the invention which incorporates many of the above features, as well as some additional features.

Figure 9:
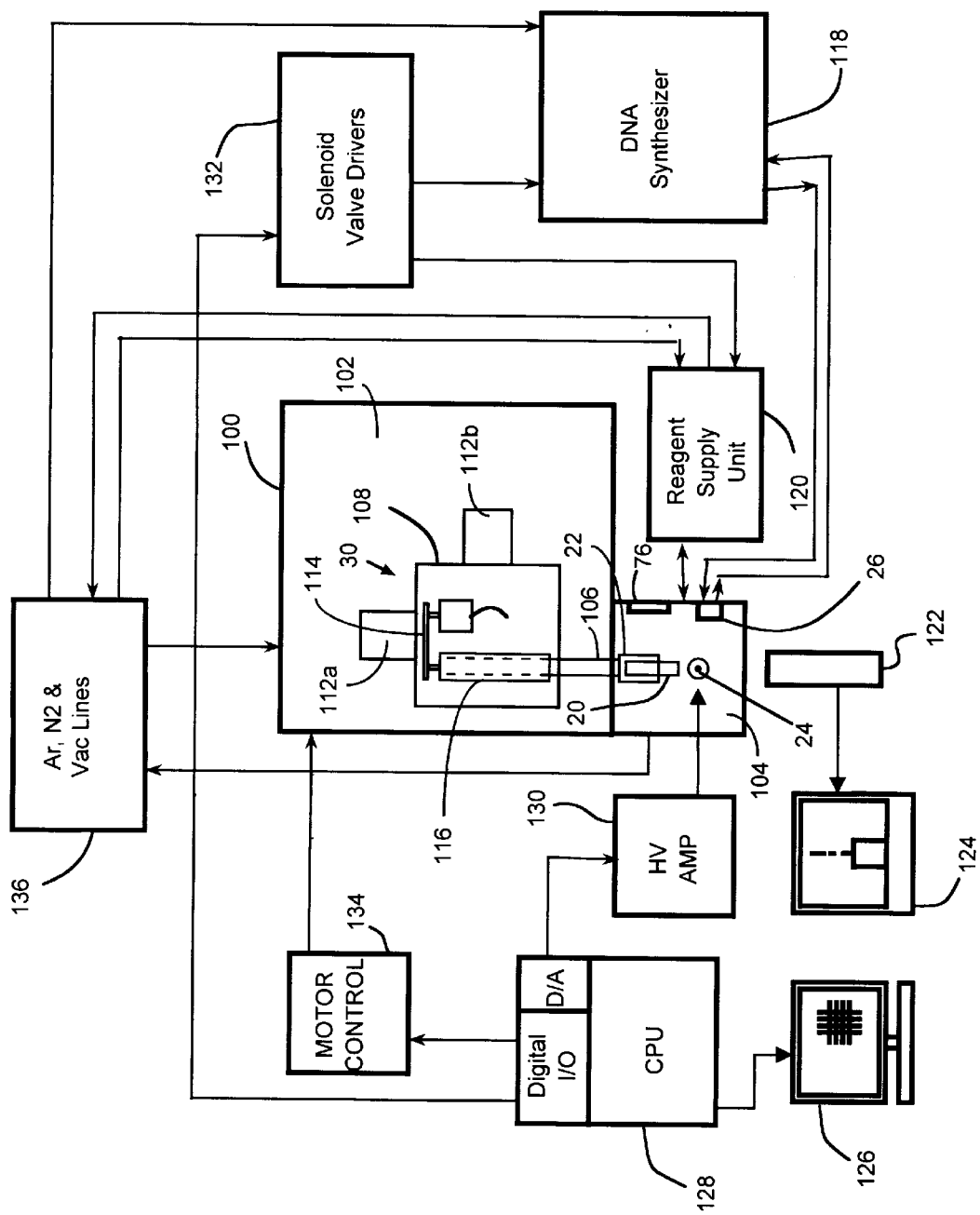
FIG. 9 is a block diagram of a specific embodiment of the invention for the synthesis of oligonucleotides on a microscope slide.

The key elements of the invention according to this specific example are shown in block diagram form in FIG. 9.

In this specific embodiment, the substrate 20 and all fluid dispensing elements are maintained in a sealed, environmentally controlled enclosure 100 throughout the array synthesis. The enclosure 100 can thus be kept free of contaminants which would shorten the life of the reagents or interfere with the synthesis.

As shown, the enclosure 100 is divided into two sections. The first section 102 contains the positioning system 30. The second section 104 contains the jetting system 24 and accessories. Between the two sections is a horizontal slot through which a rotating support rod 106 extends.

The positioning system 30 comprises an X-Y stepper stage 108 and a rotational stepper 110. The X-Y stepper stage 108 moves the substrate 20 to the jetting system 24, the wash station 76 and the reaction chamber 26. The X-Y stepper stage 108 also orients the substrate 20 relative to the jetting system 24. The stage is driven by lead screws which are connected to stepping motors 112a and 112b. The resolution of the X-Y stage system is 1 micron in X and Y.

On top of the X-Y stage is the rotational stepper 110 which is provided for rotating the substrate 20 about an axis through the center of the substrate 20 parallel to the substrate's long dimension. This results in the rotated substrate being held with its short dimension vertical. Thus, the system of FIG. 4c wherein several square arrays are jetted and individually brought into contact with the reaction chamber is utilized in this specific embodiment The rotational stepper is connected by a timing belt 114 to one end of the rotational support rod 106, which is supported by a bearing 116. A substrate holder 22 is connected to the other end of the rotational support rod 106. The substrate holder 22 is designed to hold a glass microscope slide as the substrate 20, and extends on the unreacted side of the slide to provide mounting support.

The positioning system 30 is configured to maintain a jet to substrate separation of under 400 microns.

In the design of the positioning system 30 and the placement of the elements of the invention within the enclosure, there are several considerations. First, the speed of the device is maximized. This is done by keeping the distance between the jetting, wash and reaction chamber stations short. This is also helped by utilizing a fast X-Y stage, or by moving a station close to the substrate when it is needed and retracting it when the substrate is finished at that station. Furthermore, the X-Y stage could be mounted on an additional gross positioning system which allows for quick but less accurate movement between stations.

Another prime consideration in the design of the positioning system is accuracy. The spots of reagent which are jetted onto the substrate are jetted with an accuracy of 1 micron. Individual spots in the array are spaced from 30 microns to 2 millimeters apart, usually about 50 microns. Therefore, to ensure that the drops from different stages of the synthesis are reliably jetted on top of each other, the substrate and the jetting system are reliably indexed to each other. This can be accomplished by minimizing the overall movement of the X-Y stage, and by decreasing the mechanical play in the linkages of the positioning system. In particular, it is important to make the distance between the support bearing and the end of the substrate as short as possible to minimize vibration and play in the cantilevered substrate.

The reagents to be dispensed are contained in a reservoir system comprising two components. Phosphoramidite and oxidation reagents are stored in containers in a DNA Synthesizer 118, and wash and deprotect reagents are stored in separate containers housed in the reagent supply unit 120.

The reagents in the reagent supply unit 120 are connected to the wash station 76 and to the jetting system 24. The reagent supply unit 120 is shown in detail in FIG. 13 which is discussed below.

A video camera based monitoring system allows for visualization of drops as they are ejected from the dispenser nozzle of the jetting device and impact on the substrate surface. This system comprises a video camera 122, and a monitor 124. The system allows for both horizontal viewing perpendicular to the jet nozzle and droplet trajectory and vertical viewing parallel to the jet nozzle and droplet trajectory.

The invention is controlled by a master controller comprising an input device 126 to receive directions from the operator, a processing unit 128, and electronics to translate the signals from the processing unit to a proper form for the valves, motors, and jets of the invention. The master controller allows for control of all aspects of device synthesis, especially the details of the electronic pulse and timing for activation of the piezoelectric jet (via the high voltage amplifier 130), valves for reagent delivery (via the solenoid valve drivers 132), pattern of dispersal of reagent onto the sample, translation and rotation for the sample (via motor control 134) and control of the DNA synthesizer 118 that is coupled to the reaction chamber 26.

Finally, the invention is supplied with inert gasses and a vacuum source through plumbing 136 which is detailed below and shown in FIG. 14.

Figure 10:
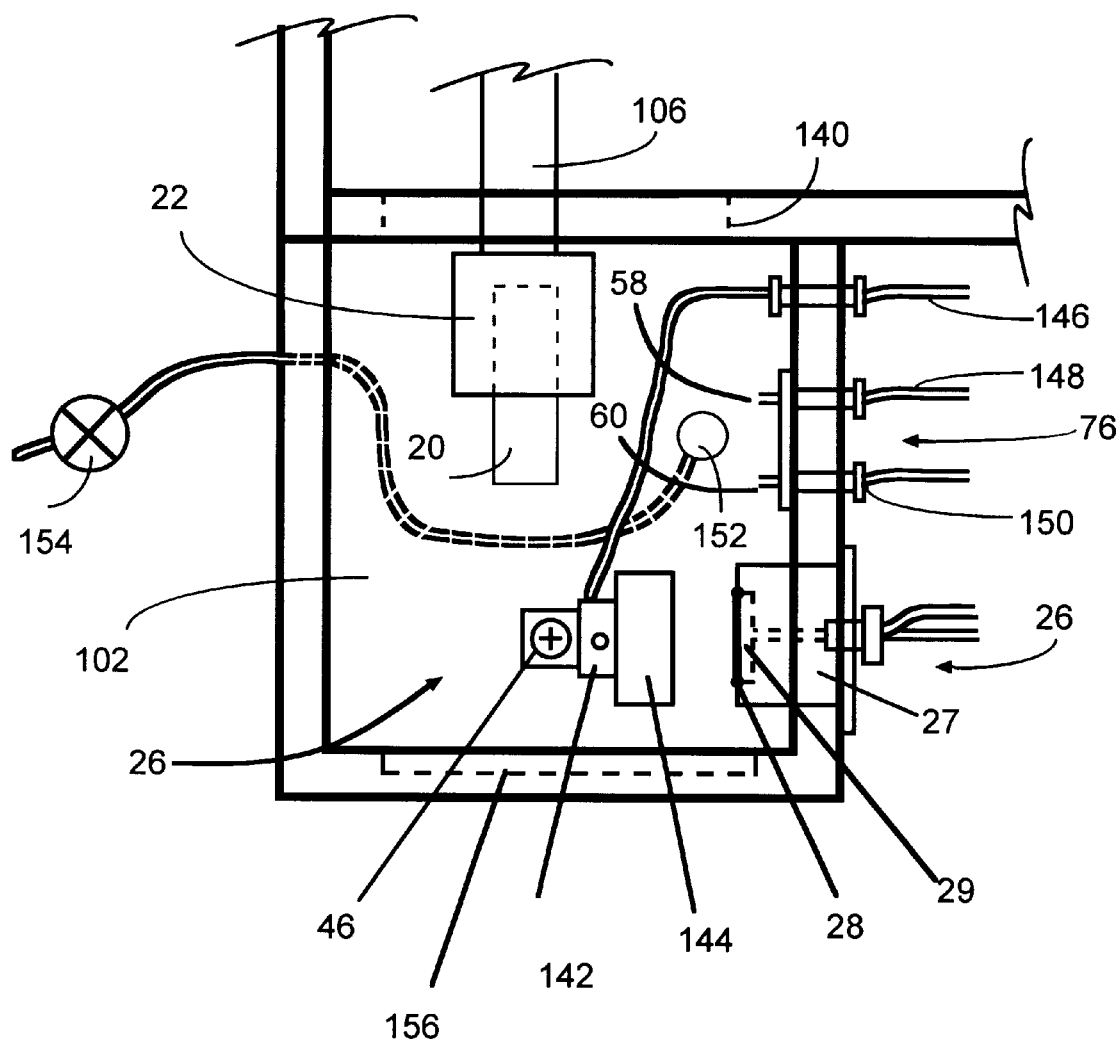
FIG. 10 is an expanded view of the main enclosure of the embodiment of the invention shown in FIG. 9.

FIG. 10 is an expanded view showing the elements within the second section of the enclosure 100.

The substrate is held in the second section by a substrate holder 22. This substrate holder 22 is connected to the positioning system via a rotating support rod 106 as described above. The rotating support rod communicates between the sections of the enclosure through a horizontal slot 140 in the wall of the enclosure.

A piezoelectric jetting device 46 (pointing up) is mounted on a Z-translator 142 which is attached to a vertical support 144. The piezoelectric jet has an orifice diameter in the range of 20 to 80 microns. The jet is capable of dispensing reagents onto loci on the slide surface that have center to center spacing of 50 microns to 2 millimeters. Fluids to be jetted enter the enclosure through an inlet port 146.

The substrate is washed between synthesis steps at the wash station 76. The wash station 76 is formed by the combination of two inlet ports 148 and 150 and corresponding orifices 58 and 60. The first inlet port 148 is for wash reagent which sprays through the small washing orifice 58 onto the substrate 20 when the substrate is positioned vertically and directly in front of the orifice 58. The second inlet port 150 is for pressurized gas to be blown through a small drying orifice 60 onto the substrate 20 when the substrate is positioned vertically and directly in front of the drying orifice 60.

Excess reagents from the wash station 76 are collected in a drain 152 at the bottom of the enclosure 102. The drain is connected via a stopcock 154 to a vacuum source.

The reaction chamber 26 comprises a mount 27 and an O-ring 28. When the substrate 20 is in vertical position and pressing against the O-ring 28 a small disk-shaped cell 29 is formed.

At the front of the second section 102 is an observation window 156 for monitoring the operation of the invention and the jetting device 46.

Figure 11:
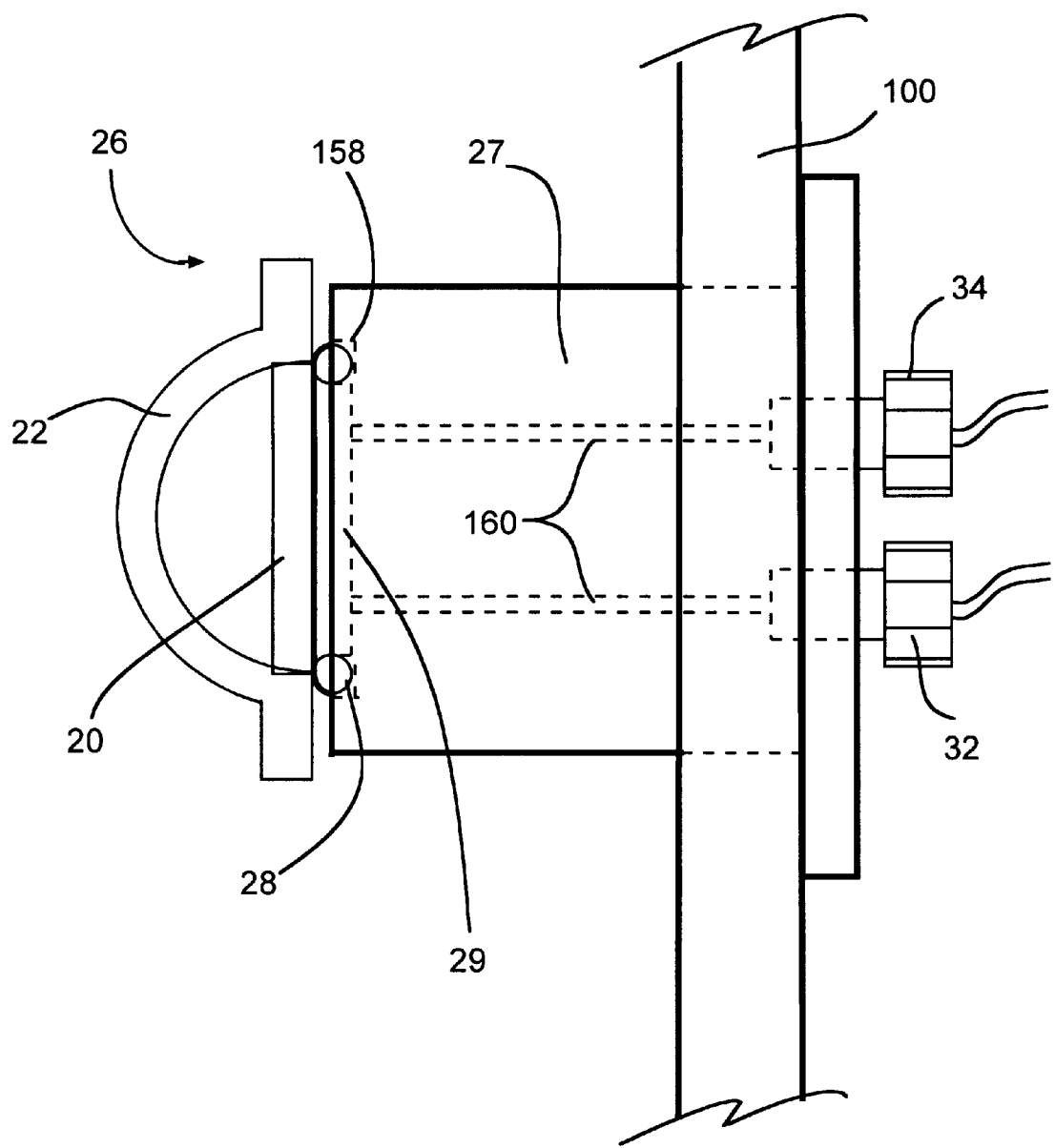
FIG. 11 is a detailed view of the reaction chamber of the embodiment of the invention shown in FIG. 9.

FIG. 11 shows a detailed side view of the reaction chamber 26. A disk-shaped cell 29 is formed by pressing the substrate 20 against the O-ring 28 which is pressed in a groove 158 of the mount 27. Reagents from the DNA synthesizer enter at the bottom port 32, fill the reaction chamber cell 29 and flow out of the upper port 34 via channels 160. The molecular array with which the reagents are to react with is on the inside surface of the substrate 20 within the formed cell 29.

FIG. 12 shows an alternate configuration of elements in the second section of the enclosure. In this configuration, the substrate 20 is not moved from station to station, but instead rotated to face each station in turn. Then, the station which the substrate is facing is moved to come into contact with the substrate.

In FIG. 12, the wash station 76 is shown utilizing the same construction as the reaction chamber 26. In this way, there is no need for a drain to capture the spent wash reagent, and the enclosure 100 is kept free of contamination that would otherwise enter through the open wash station as shown in FIG. 8.

Figure 12A:
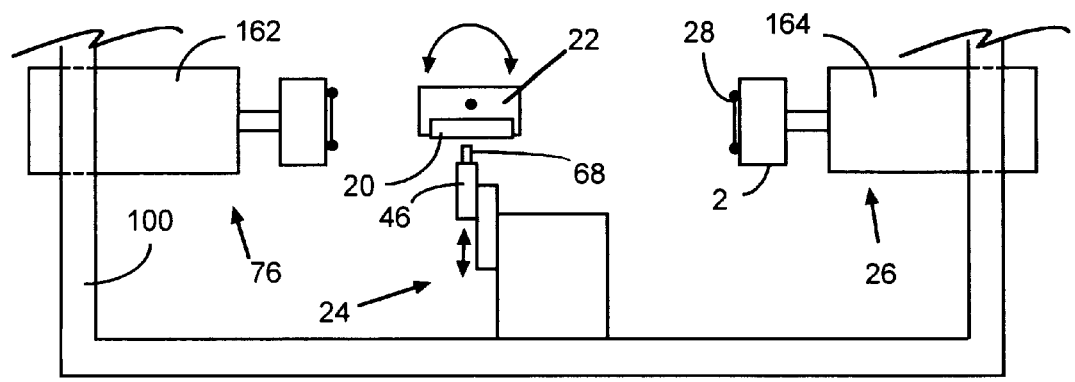
FIGS. 12A, 12B and 12C is a detailed view of an alternative arrangement of elements in the main enclosure of the invention shown in FIG. 9.

In operation, the substrate 20 is first rotated to face the jetting system 24 as in FIG. 12a. Then, the jet 46 is raised to position the nozzle 68 the proper distance from the substrate 20. After the desired pattern is jetted, the jet 46 is retracted. Then, the substrate 20 rotates to face either the wash station 76 or the reaction chamber 26, according to the desired sequence.

Figure 12B:
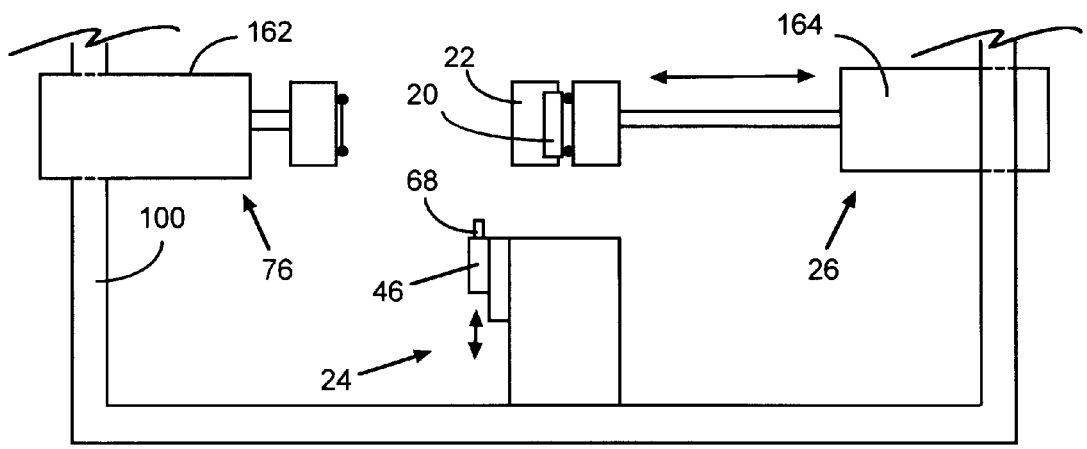
Figure 12C:
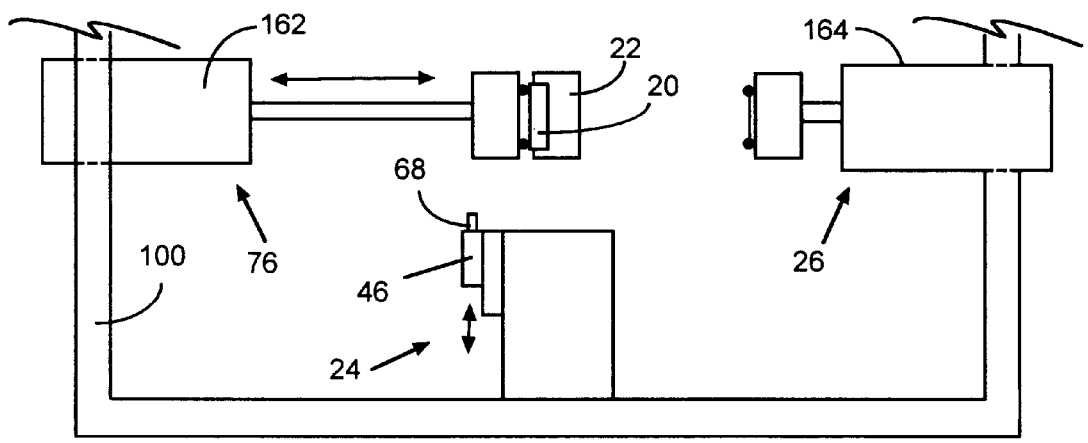

When the substrate is rotated to face the reaction chamber 26, as shown in FIG. 12b, the reaction chamber 26 is brought to seal against the substrate 20 via a linear actuator 162. Likewise, when the substrate 20 is rotated to face the wash station 76, the wash station 76 is brought to seal against the substrate 20 by a linear actuator 164 as shown in FIG. 12c. After the substrate 20 is finished at a particular station, the station is retracted and the substrate may be rotated to the next station in the sequence.

Figure 13:
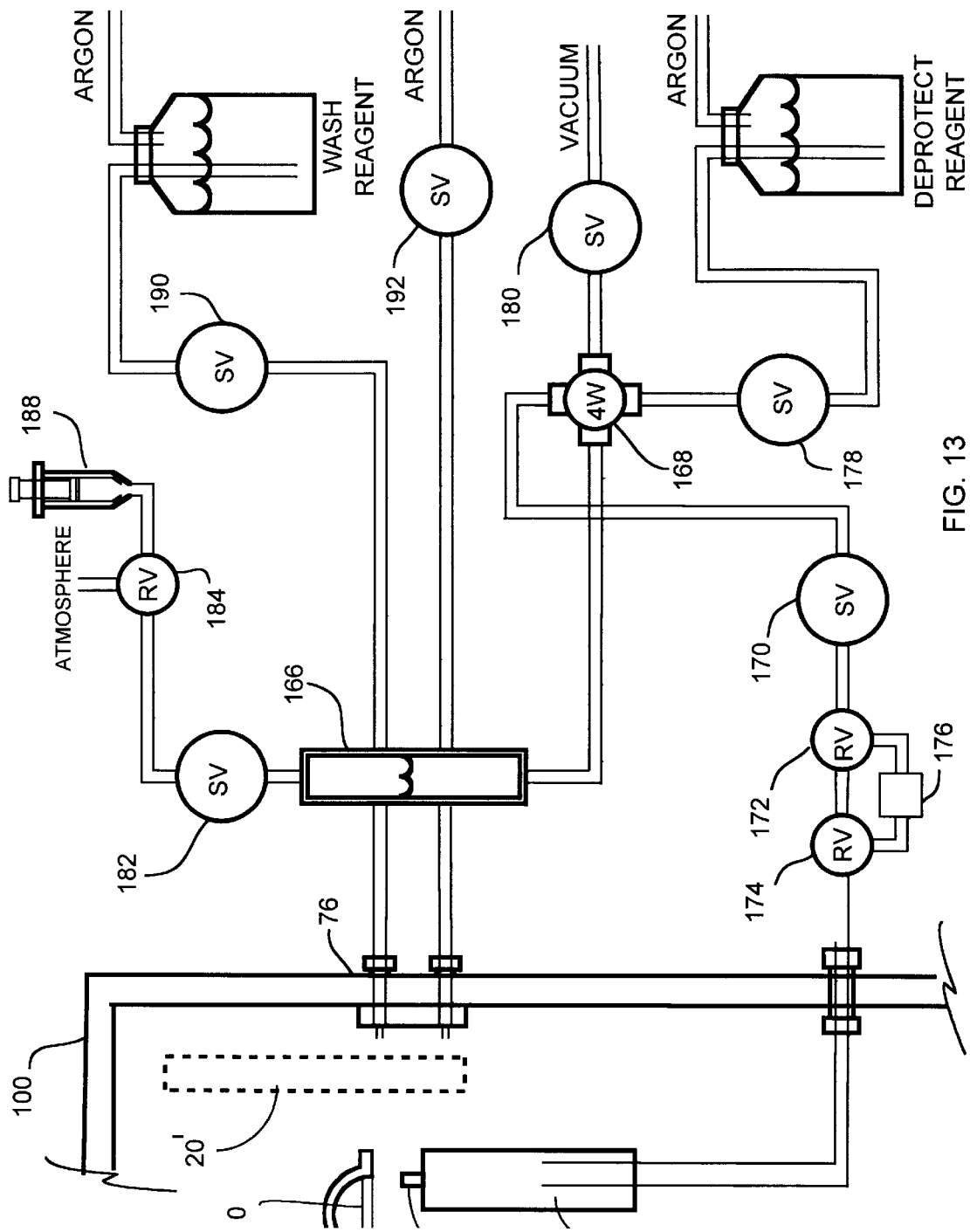
FIG. 13 is a is a detailed view of the valve control unit of the embodiment of the invention shown in FIG. 9.

FIG. 13 shows the reagent supply unit, which contains the deprotect reagent and the wash reagent, as well as the conduits and valves necessary to route these reagents to the wash station 76 and the jetting device 46.

The system contained in the valve control unit is designed for precise control of the static pressure exerted at the nozzle 68 of the jet 46. The priming of the jet is accomplished via a set of valves under computer control. Through this system, the static pressure at the jet nozzle is controlled precisely within the range of ±2 centimeters height of reservoir liquid in relation to the nozzle. The operation of this system is controlled by the master controller and comprises six modes of operation.

1. In the normal jetting situation the deprotect reagent is routed to the jet 46 at a controlled pressure. A pressure control reservoir 166 establishes the fluid pressure to the jet nozzle 68 via a four-way splitter 168, through a solenoid valve 170, with rotational valves 172 and 174 positioned for flow through filter 176. The filter 176 is a 2 micron filter which can be bypassed by repositioning valves 172 and 174 as needed during initial setup and rinse operations. During normal operation solenoid valves 178 and 180 are closed and solenoid valve 182 is opened. Rotational valve 184 is opened to the atmosphere.

2. To fill the pressure control reservoir 166, valves 170, and 180 are closed and valves 178 and 182 are opened with valve 184 vented to atmosphere.

3. To forward rinse the jet, valves 182 and 180 are closed and valves 178 and 170 are opened with valves 174 and 172 set to bypass filter 176.

4. To reverse rinse and dry the jet, the valves are set as for forward rinse, except valve 178 is closed and valve 180 is opened. Cleaning solvent is then applied as a small stream to the nozzle 68 of the jet 46. The vacuum sucks fluid through the jet in reverse direction.

5. To manually prime and set the fluid level in the pressure control reservoir 166, the reservoir 166 is first filled above operating level, and the valves are set for normal jetting operation. Then, valve 184 is opened and the syringe 188, filled with air, is pushed to force the excess fluid through the jet nozzle 68 until the pressure control reservoir 166 level is set as needed.

6. To rinse and dry the substrate 20 the substrate 20' is positioned vertically next to the wash station 76. Then, solenoid valve 190 is opened for a several second interval. A stream of wash reagent is thus directed against the active side of the substrate while the substrate is moved back and forth laterally. Then valve 190 is closed and valve 192 is opened for argon gas flow to dry the substrate surface.

The rotational valves and the solenoid valves are connected to the master controller via conventional electrical connectors.

Figure 14:
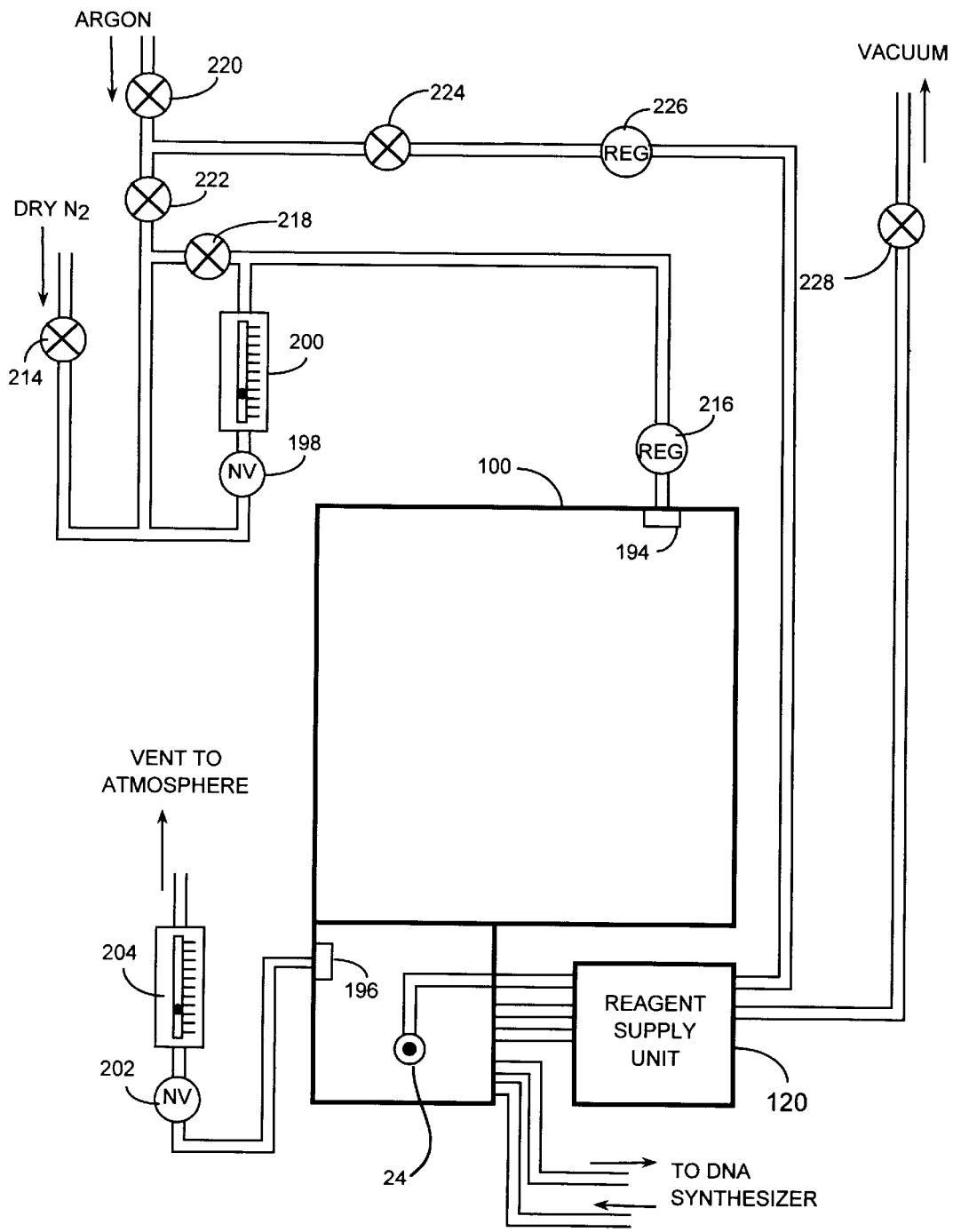
FIG. 14 is a is a detailed view of the gas and pressurization plumbing of the embodiment of the invention shown in FIG. 9.

FIG. 14 shows details of the gas and pressurization plumbing. Dry gas enters the enclosure 100 through port 194 and exits through port 196. The dry gas can be any inert gas, e.g. nitrogen or argon. To purge the enclosure with dry nitrogen, a stopcock 214 connected to dry nitrogen, is opened. Gas flows through a needle valve 198 and a flow meter 200 to a regulator 216 set at 2–4 psi used to establish a positive atmosphere in the enclosure 100 during normal operation. A bypass stopcock 218 is provided to bypass the flow meter 200 and needle valve 198 as necessary. On the exit side, the gas flows through a needle valve 202 which establishes the flow rate through the enclosure 100 as monitored by flow meter 204. To use argon as the purge gas, the stopcocks are set as above except the nitrogen stopcock 214 is closed and the argon stopcocks 220 and 222 are open.

The rate of gas leakage in the enclosure can thus be determined by comparing the rate of gas ingress and egress as shown in the flow monitors 200 and 204.

The valve control unit is supplied with argon through the argon stopcocks 220 and 224. The gas flows through a regulator 226 (set at 6–8 psi) to the reagent supply unit 120.

A vacuum line is connected to the reagent supply unit 120 through a vacuum stopcock 228.

The version of the invention as shown in FIGS. 9–14 and described above is used for the automatic formation of molecular arrays on a substrate. The device is used to synthesize oligonucleotides in loci on the surface of the substrate where individual loci are separated by 50 to 500 microns. This can be done using the phosphoramidite method of synthesis. The entire synthesis is preformed in the sealed, environmentally controlled enclosure 100.

First, an activated glass slide is provided as a substrate 20. An activated slide is one which is prepared with the first monomer in the synthesis chain already on the glass. This slide is loaded into the substrate holder 22. Next, a sequence of instructions is loaded into the master controller via the input device 126. The controller is instructed as to the sequence of nucleotides which the operator desires to synthesize. A unique sequence may be specified at each spot in the synthesis array. Generally, any pattern of polymers to be synthesized may be specified. After the controller is instructed, reagents for synthesis are loaded into the containers in the DNA synthesizer 118 and the reagent supply unit 120. Finally, the pressure for the deprotect reagent is set in the reagent supply unit 120.

Upon a signal from the operator, the invention begins synthesis. First, the controller converts the sequence of instructions into a sequence of electrical signals to command the positioning system 30, to control the valves in the conduit system, and to determine the pulse shape for the jetting system. The controller initializes the process by commanding the positioning system to rotate the substrate 20 to the horizontal position and place it above the jetting system. The controller then indexes the substrate 20 to the jetting system 24 for precise placement of the spots of reagent at particular loci on the substrate 20.

Next, the reagents for synthesis are delivered to the individual loci using the jetting device 46 held at a fixed location and moving the substrate 20 with the X-Y stage. The control system may allow for dispersal of any desired pattern of reagent on the substrate 20. The controller commands the valves in the reagent supply unit 120 to deliver the jetting reagent to the jetting device 24.

The reagent jetted is the deprotect reagent. Where the deprotect reagent contacts the phosphate monomers on the surface of the slide, the trityl group is removed from the molecule. This exposes a free site on the monomer which will react with the next phosphoramidite reagent which is applied. Thus, the next phosphoramidite will only react at specific locations on the substrate, defined and controlled by the controller. By varying the sites which are de-protected at each stage of the synthesis, the operator thus has control over the sequence of the nucleotides at each location on the substrate. Furthermore, the controller maintains a record of the exact sequence which is synthesized at each location so the operator knows which sequences were synthesized at each position.

After the jetting device has de-protected the desired locations, the substrate is moved to the front of the wash station and rotated to a vertical position. A wash stream is directed against the substrate as the substrate is moved laterally past the nozzle. The substrate is then dried with a stream of compressed gas. This washing step removes any extra, unreacted deprotect reagent from the substrate. Drying the substrate prepares it to come into contact with the reaction chamber without contaminating the chamber with the aqueous solution.

After drying, the substrate is moved to a position where the reaction chamber 26 is formed with a surface of the substrate by sealing the surface of the substrate against the mount 27 by means of an O-ring 28. A phosphoramidite reagent is flowed into the cell 29 from the reservoir system in the DNA synthesizer 118 such that the entire region is uniformly coated with reagent. Where the previous phosphate monomer in the chain has been de-protected, the new phosphite couples with the old monomer to add another nucleotide to the sequence which is being synthesized. During this reaction, the amine group on the phosphoramidite molecule is lost as the resulting phosphite molecule couples with the previous monomer. The amine is carried out of the top of the reaction chamber with the reactant solution.

Upon completion of the chemistry that occurs in the reaction chamber 26, the substrate 20 is again washed and dried at the wash station 76 and returned to the reaction chamber. This time, the phosphite molecules are oxidized by the application of an oxidizing reagent in the chamber, to form phosphates. The substrate is again washed and dried at the wash station, and is ready for subsequent cycles of synthesis that would begin with jet-based reagent dispersal.

During jetting and while reactions are taking place in the reaction chamber, the temperature of the substrate must be controlled. The control of the substrate temperature is important to facilitate the reactions that occur in the synthesis. In particular, heat must be added to many of the synthesis reactions in order for the reaction to take place. This temperature control could be accomplished by providing in the substrate holder 22 means for heating the substrate 20 under control of the master controller. Alternatively, the entire enclosure 100 could be maintained at the appropriate temperature by heating the inert gas which enters the enclosure. Also, the reagents which are used could be heated before they contact the substrate so as not to affect the temperature of the substrate upon contact with the substrate surface.

Using the above process, the present invention is able to synthesize great numbers of unique chains of oligonucleotides in a very small area. This is done with great precision and speed, which makes the synthesis economical. Because the controller will tell what composition is at each site on the array, the operator is able to use the compositions for diagnostic or therapeutic purposes—wherever a large number of identifiable sequences is desired. These uses might include forensic medicine or the development of drugs.

All references mentioned in this specification are herein incorporated by reference to the same extent as if each individual reference was specifically and individually indicated to be incorporated by reference.

Although the present invention has been described in considerable detail with reference to certain preferred versions thereof, the person skilled in the art will appreciate that other versions are possible. Therefore, the spirit and scope of the appended claims should not be limited to the description of the preferred versions contained herein.

What is claimed is:

1. A system for the chemical synthesis of molecular arrays on a substrate comprising:
    a jetting system;
    a reaction chamber;
    a receptacle for receiving individual reagents;
    a conduit system connecting said jetting system and said reaction chamber to said receptacle;
    a substrate holder;
    a positioning system for cyclically moving said substrate holder between:
        a first position where said substrate is positioned horizontally in operating relationship with said jetting system for applying a reagent at a pre-determined locus, wherein the distance between adjacent loci is from 30 microns to 2 millimeters, and
        a second position where said substrate is positioned vertically in operating relationship with said reaction chamber for reagents to be dispensed in a non-localized manner; and
    a master controller connected to:
        (1) said conduit system for directing individual reagents from said receptacle to either said reaction chamber or said jetting system in a pre-determined order, and
        (2) said positioning system for directing the movement of said substrate holder in a pre-determined pattern.

2. A system for the chemical synthesis of molecular arrays on a substrate comprising:
    a jetting system;
    a reaction chamber capable of being maintained in an anhydrous atmosphere;
    a wash station;
    a reservoir system comprising a plurality of containers containing individual reagents, one of which is a deprotect reagent, and one of which is a wash reagent;
    a conduit system connecting said jetting system, said reaction chamber, and said wash station to said reservoir system;
    a substrate holder;
    a positioning system for cyclically moving said substrate holder between:
        a first position where said substrate is oriented with respect to said jetting system,
        a second position where said substrate is in operating relationship with said wash station, and
        a third position where said substrate is in operating relationship with said reaction chamber; and
    a master controller connected to:
        (1) said conduit system for directing said deprotect agent from said reservoir system to said jetting system, said wash reagent from said reservoir system to said wash station, and said other reagents from said reservoir system to said reaction chamber in a pre-determined order, and
        (2) said positioning system for directing the movement of said substrate holder in a pre-determined pattern.

3. A system for the chemical synthesis of molecular arrays on a substrate comprising:
- a piezoelectric jetting device;
- a reaction chamber;
- a wash station comprising:
  - means for washing and drying said substrate;
  - a reservoir system comprising a plurality of containers containing individual reagents, one of which is a deprotect reagent and one of which is a wash reagent;
  - a conduit system connecting said jetting device, said reaction chamber, and said wash station to said reservoir system;
- a substrate holder;
- a positioning system for cyclically moving said substrate holder between:
  - a first position where said substrate is oriented either horizontally or vertically with respect to said jetting system for applying a reagent at a pre-determined locus wherein the distance between adjacent loci is from 30 microns to 2 millimeters, and
  - a second position where said substrate is oriented either horizontally or vertically in operating relationship with said wash station, and
  - a third position where said substrate is oriented vertically in operating relationship with said reaction chamber for reagents to be dispensed in a non-localized manner; and
- a master controller connected to:
  - (1) said conduit system for directing said deprotect agent from said reservoir system to said jetting system, said wash reagent from said reservoir system to said wash station, and said other reagents from said reservoir system to said reaction chamber in a pre-determined order, and
  - (2) said positioning system for directing the movement of said substrate holder in a pre-determined pattern.

4. A system according to claim 3 further comprising a droplet monitoring system.

5. A system according to claim 3 wherein said reaction chamber comprises means for hermetically sealing said reaction chamber against said substrate.

6. A system according to claim 3 wherein said substrate is positioned vertically in said third position where said substrate is in operating relationship with said reaction chamber and said substrate is positioned horizontally in said first position where said substrate in oriented with respect to said jetting system.

7. A method of synthesizing an oligonucleotide array on an activated substrate utilizing phosphoramidite in a device with a jetting system and a reaction chamber involving cycling said substrate between a first site where the substrate is operably positioned with the jetting system and a second site where the substrate is operably positioned with the reaction chamber, said method comprising:
repeating the following steps:
  (1) orienting said activated substrate to said reaction chamber,
  (2) oxidizing the phosphites on said activated substrate to form phosphates by immersing the surface of said activated substrate in an oxidation reagent in said reaction chamber,
  (3) detritylating said phosphates by immersing the surface of said activated substrate in a deprotect reagent in said reaction chamber,
  (4) orienting said activated substrate with respect to said jetting system, and
  (5) jetting a pattern of phosphoramidite at selected loci, wherein the distance between adjacent loci is from 30 microns to 2 millimeters, on said activated substrate in an anhydrous atmosphere.

8. A method of synthesizing an oligonucleotide array on an activated substrate utilizing phosphoramidite and deprotect in a device with a jetting system and a reaction chamber involving cycling said substrate between a first site where said substrate is operably positioned with said jetting system and a second site where said substrate is operably positioned with said reaction chamber, said method comprising:
repeating the following steps:
  (1) orienting said activated substrate with respect to said jetting system,
  (2) jetting a pattern of deprotect at selected loci, wherein the distance between adjacent loci is from 30 microns to 2 millimeters, on said activated substrate,
  (3) orienting said activated substrate to said reaction chamber,
  (4) immersing the surface of said activated substrate in a phosphoramidite reagent in said reaction chamber, and
  (5) oxidizing the phosphites on the surface of said activated substrate to form phosphates by immersing the surface of said activated substrate in an oxidation reagent in said reaction chamber.

9. A method of synthesizing an oligonucleotide array on a substrate using phosphoramidite and deprotect in a device with a jetting system, a reaction chamber and a wash station involving cycling said substrate between a first site where said substrate is operably positioned with said jetting system, a second site where said substrate is operably positioned with said wash station, and a third site where said substrate is operably positioned with said reaction chamber, said method comprising:
repeating the following steps:
  (1) orienting said activated substrate with respect to said jetting system,
  (2) jetting a pattern of deprotect at selected loci, wherein the distance between adjacent loci is from 30 microns to 2 millimeters, on said activated substrate,
  (3) orienting said activated substrate to said wash station,
  (4) washing said activated substrate to remove all unreacted reagent and other contaminant,
  (5) drying said activated substrate,
  (6) orienting said activated substrate to said reaction chamber,
  (7) immersing the surface of said activated substrate in a phosphoramidite reagent in said reaction chamber,
  (8) removing unreacted phosphoramidite from said substrate,
  (9) orienting said activated substrate to said reaction chamber,
  (10) oxidizing the phosphites on the surface of said activated substrate to form phosphates by immersing the surface of said activated substrate in an oxidation reagent in said reaction chamber,
  (11) orienting said activated substrate to said wash station,
  (12) washing said activated substrate to remove all unreacted reagent and other contaminant, and
  (13) drying said activated substrate.

10. A system for the chemical synthesis of molecular arrays on a substrate comprising:

a jetting system;

a reaction chamber;

a receptacle for receiving individual reagents;

a conduit system connecting said jetting system and said reaction chamber to said receptacle;

a substrate holder;

a positioning system for cyclically moving said substrate holder between:

a first position where said substrate is positioned vertically in operating relationship with said jetting system for applying a reagent at a pre-determined locus, wherein the distance between adjacent loci is from 30 microns to 2 millimeters, and a second position where said substrate is positioned vertically in operating relationship with said reaction chamber for reagents to be dispensed in a non-localized manner; and a master controller connected to:
(1) said conduit system for directing individual reagents from said receptacle to either said reaction chamber or said jetting system in a pre-determined order, and
(2) said positioning system for directing the movement of said substrate holder in a pre-determined pattern.

11. A system according to claim 1 or 10 wherein said jetting system comprises a plurality of jetting devices.

12. A system according to claim 1 or 10, wherein said substrate forms a wall with said reaction chamber, when said substrate is in operating relationship with said reaction chamber.

13. A system according to claim 1 or 10, wherein said jetting system comprises a piezoelectric jetting device.

14. A system according to claim 1 or 10, wherein said jetting system comprises a bubble jetting device.

15. A system according to claim 1 or 10, wherein said jetting system comprises a jetting device comprising a reservoir and a nozzle, and the static pressure at said jet nozzle is controlled within ±2 cm of reservoir liquid height in relation to said nozzle.

16. A system according to claim 1 or 10 wherein at least one jetting device is capable of being maintained in an anhydrous atmosphere, and wherein system contains a reservoir system comprising a plurality of containers for containing individual reagents, at least one of which is a phosphoramidite reagent.

17. A system according to claim 16 wherein said jetting system comprises a plurality of jetting devices.

18. A system according to claim 1 or 10 which contains a reservoir system comprising a plurality of containers containing individual reagents, one of which is a deprotect reagent.

* * * * *